UNITED STATES PATENT OFFICE.

WESLEY G. NICHOLS, OF CHICAGO HEIGHTS, ILLINOIS, ASSIGNOR TO AMERICAN MANGANESE STEEL COMPANY, OF CHICAGO, ILLINOIS, A CORPORATION OF MAINE.

METHOD OF RECOVERING MANGANESE STEEL.

1,291,656. Specification of Letters Patent. Patented Jan. 14, 1919.

No Drawing. Continuation of application Serial Nos. 91,118, filed April 14, 1916, and 152,107, filed March 2, 1917. This application filed May 31, 1918. Serial No. 237,426.

*To all whom it may concern:*

Be it known that I, WESLEY G. NICHOLS, a citizen of the United States, residing at Chicago Heights, in the county of Cook and State of Illinois, have invented certain new and useful Improvements in Methods of Recovering Manganese Steel, of which the following is a specification.

This invention relates to the method of recovering or reusing manganese steel available from scrap or other sources of steel which contains manganese in sufficient proportions to render the steel of especial value, and the invention has for its primary object to provide a method of melting such steel with a minimum loss of its manganese content, and thus maintaining the essential character of the steel as a manganese steel and adapting it for commercial delivery as such, if desired, or so far reducing the loss of the manganese in the remelting as to effect great saving in the quantity of this element that must be added in case the recovered manganese steel is to be incorporated into, or used for alloying with, a body of blown metal in the production of a new and larger heat of manganese steel.

The present application is a continuation of my application Serial Number 152,107, filed March 2, 1917, and of my application Serial Number 91,118, filed April 14, 1916.

In the following specification, the term "manganese steel," except where the context otherwise indicates, will be used to denote steel showing a manganese content of some percentage commercially recognized as lending particular character to the steel. Such steel usually shows a manganese content of from 11 to 14% and a carbon content of from 1.1 to 1.4%. The term "blown metal" will be used to denote decarburized iron, such, for instance, as the metal in the bath resulting from the completed Bessemer operation in a converter. "Ferro-manganese" denotes the commercial product usually containing on an average of 80% manganese, 6% carbon, and 10 to 12% iron.

It has long been recognized that owing to the ready oxidation and even vaporization of manganese that occur at the high temperatures attained in blown metal, the now exceedingly valuable manganese element existing in considerable quantities in scrap and other forms of manganese steel is mainly lost when such steel is melted by the methods ordinarily employed for working-over steel and entirely lost if the manganese scrap is blown with the charge of material delivered to the converter. Various proposals have been made for avoiding this loss. These have generally been along the lines of controlling the environment in which the manganese steel is melted, with a view to excluding oxidizing influences as far as practicable; utilizing a covering of basic slag or the like to protect the metal bath from such oxygen as cannot be excluded from the furnace; supplying substances more readily oxidizable than manganese, and thereby consuming the limited amount of oxygen that does gain access to the bath; and supplying substances that will reduce a portion of the oxidized manganese that may have been taken up by the slag, and thereby returning the manganese to the bath.

But all these methods involve objectionable features, and succeed but partially, if at all. In most of them the temperature is excessive at the source of heat employed (for instance, the electric arc), if not throughout the entire bath, so that oxidation and even vaporization of the contained manganese takes place at least on the surface of the scrap, or in the immediate presence of the heat source, if not throughout the bath, besides involving undesirable expenditure for counteracting materials and prolonging the time required for the treatment. None of them, so far as I am aware, has attained the success in retaining the manganese that is insured by my present invention, which avoids the difficulties mentioned, reduces to a minimum the oxidation of manganese, wholly prevents vaporization, and reduces the time element, besides permitting ferro-manganese to be melted with the scrap, and thereby simplifies the apparatus required and reduces labor employed, where the process involves increasing the manganese constituent for some ultimate use to be made of the product, such as alloying with a larger heat of blown metal.

It is well recognized that the heat conductivity of manganese steel is extremely low, in fact so low that when pieces having any material thickness are introduced cold into a furnace having a melting temperature, the skin of the piece quickly becomes fluid and runs long before the interior is heated. Thus if manganese steel scrap which consists of risers, sprues and crop ends of ingots, blooms, billets, and the like, is charged cold into a furnace in which a melting temperature of manganese steel is maintained, even with or without a slag or a bath of iron or steel, the skin of these chunks of scrap will become fluid quite rapidly and the manganese will have opportunity to oxidize or to unite with the slag. The addition of reducing agents to the slag will serve to precipitate the manganese but it will also make necessary the decarburization of the steel as the carbon content will change. To decarburize the steel necessarily involves a high temperature and consequent loss of manganese.

While proceeding upon lines which maintain a non-oxidizing environment for the bath, so far as the same may be obtained by inclosing the bath, covering with basic slag, and the like, the underlying feature of my process resides in controlling the temperature of the source of heat and through the temperature of the source, regulating the temperatures under which the proceeding takes place, so that not only is the bath as a whole prevented from reaching vaporizing or even oxidizing temperatures during the melting, but no part of the bath or of the fragments of scrap is subjected to any such temperature in advance of the whole body of metal; on the contrary, the temperature of the heat source and of the bath is developed in stages, and the manganese lying upon the surface of the pieces of scrap or in the immediate presence of the arc is protected equally with that contained on the interior of the pieces, or throughout the entire bath. At the final heat stage, which may be sufficient to induce oxidation, precautions will have been taken to afford the greatest possible protection to the metal, and the temperature will exist only for the shortest time, being developed immediately preceding the drawing of the furnace.

In carrying out the invention, an electric furnace is preferably employed because of the facility with which atmosphere can be excluded therefrom, but any other method of heating which combines the feature of excluding oxidizing influences with controlled temperature of the heat source may be employed.

Having charged the furnace with the scrap or other form of manganese steel, care is exercised to avoid a temperature at the arc in excess of 1200° F. until the entire bath has reached that temperature, and until means have been provided or are ready for application to protect against oxidation under the further increase of temperature. Even the temperature of 1200° F. is preferably approached gradually or in stages, by first using even a lower temperature in the arc and developing the same throughout the bath and gradually increasing the temperature of the arc or heat source, and in this way working up to 1200° F. In the preferred procedure, an initial temperature stage as low as 600° F. may first be developed with advantage, as by charging cold scrap into a cold furnace and developing an arc at such voltage as will produce a heat of substantially 600° F., and maintaining this heat until the whole body of the metal is at a homogeneous temperature. Preferably the electrode is so adjusted as to permit the creation of an arc of as short length as is possible and to bring the arc into close proximity with the scrap. The voltage being low assures the conduction of energy of not too vigorous action, which will prevent any but a gradual heat application to the scrap. Then the arc is increased and the temperature increased by stages through 600°, 700°, etc., up to 1200° F. Or, if the furnace has not fully cooled down from a previous heat, but stands at a temperature of, say 1500° F., after having been opened and had necessary repairs made to its lining, the cold scrap may be charged into the furnace, by which time the temperature will have fallen to 600° or 700° F., then the furnace is closed and permitted to stand closed without application of additional heat until the charge has absorbed heat from the walls of the furnace and been brought to an initial temperature of, say 500° F., after which the arc will be developed with restricted voltage to create a temperature equal to that of the scrap and furnace, i. e. 500° F., and then developed in successive stages of temperature, which will gradually work the heat of the bath through 600°, 700°, etc., up to 1200° F.

At 1200° F. the charge of manganese steel will begin to assume a mushy or broken-down condition, and before going much beyond this state, there should be provision made for resisting such oxidation as might occur from even the limited proportion of oxygen that is unavoidably present within the furnace. These precautions will be in the nature of a basic slag, which, or the slagging fluxes for production of which, may be added either at this stage or at an earlier stage, or even at the time of charging the furnace or partly at the time of charging and partly as the increased temperature stages are attained if observation shows the covering of slag to be insufficient. Up to this temperature, i. e. 1200° F. serious oxidation of the magnanese will not take place; much less will there have been much loss by vaporization.

The temperature of the bath is raised gradually or in stages to approximately 1200° F. and above 1200° F. in like manner, in the sense that the temperature of the heat source is controlled, and, therefore, the temperature in any one part materially in excess of that of the whole bath is carefully avoided until it reaches about 2400° F. at which manganese steel is completely fused, and the slag exists at the top and forms the protecting covering against oxygen that may be present in the unfilled space of the furnace. The bath may safely be retained at this temperature for such length of time as may be necessary pending preparations for tapping the furnace. This tapping may be made into a pouring ladle for casting into billets, or molds, or for transfer to and alloying with a heat of blown metal. In the latter instance additional manganese will be added, as explained below.

When the metal is ready to be tapped, the temperature may be cautiously increased above substantially 2400° F. to render the bath highly fluid, but this increase will be relatively harmless because the bath is now well protected, and the increased temperature will exist for but a short time.

I have found that by proceeding as above outlined the loss of manganese in the reuse of manganese steel scrap will be reduced to a very small percentage of the original manganese content, and, indeed, to such a small percentage as will permit the reuse of the manganese steel as such, and without restoring any of its manganese content. However, the restoration of the proportion of manganese can be readily accomplished by charging into the furnace a suitable quantity of ferro-manganese, the quantity of which is readily estimated because the analysis of the manganese steel scrap originally charged is accurately known, and its loss of manganese has been so well controlled that it will be of a constant and readily estimated small percentage.

If the bath of manganese steel obtained as above described is to be used for alloying a larger body of blown metal, for instance, in the production of manganese steel, it will, of course, be necessary to add a suitable percentage of ferro-manganese. The addition of manganese for this purpose can be made in the same furnace with the melted scrap and at a temperature stage that will practically avoid loss by oxidation. Thus a very great saving in this now expensive alloying element will be effected, and the use of a separate furnace and the firing and labor cost of serving the same will be avoided.

I do not claim in this application the method of producing manganese steel by the use of the subject-matter of the present application, as this is described and claimed in my application Serial Number 151,882, filed March 2, 1917.

What I claim is:

1. The improvement in the art of recovering manganese steel, which consists in applying heat to the steel at an initial temperature below the oxidizing temperature of manganese, and at successively increasing stages of temperature until the entire mass is gradually brought to the melting point of manganese steel.

2. The improvement in the art of recovering manganese steel, which consists in applying heat to the steel at an initial temperature below the oxidizing temperature of manganese, and at successively increasing stages of temperature until the entire mass is gradually brought to the melting point of manganese steel; the process being carried on in a relatively inert environment.

3. The improvement in the art of recovering manganese steel, which consists in applying heat to the steel at an initial temperature below the oxidizing temperature of manganese, and at successively increasing stages of temperature until the entire mass is gradually brought to the melting point of manganese steel; the process being carried on in a relatively inert environment, and the presence of a protecting covering for the bath being insured by the time the bath attains the melting temperature.

4. The improvement in the art of recovering manganese steel, which consists in applying heat to the steel at an initial temperature below the oxidizing temperature of manganese, and at successively increasing stages of temperature until the entire mass is gradually brought to the melting point of manganese steel; the bath being maintained at about the melting temperature until the metal is needed, and the temperature being increased to the point of high fluidity of the metal immediately preceding the tapping of the furnace.

5. The improvement in the art of recovering manganese steel, which consists in heating the charge of metal by an initial application of heat not over 700° F., and then increasing the applied heat in stages to bring the entire mass gradually to the melting point of the steel.

6. The improvement in the art of recovering manganese steel, which consists in heating the charge of metal by an initial application of heat not over 700° F., and then increasing the applied heat in stages to bring the entire mass gradually to the melting point of the steel, maintaining the temperature at about the melting point until the metal is needed, and raising to the temperature of high fluidity just previous to tapping.

7. The improvement in the art of recovering manganese steel, which consists in developing an initial temperature of below 700° F. throughout the charge of metal, gradually increasing the temperature of the bath to 1200° F., and thereafter raising the temperature to about 2400° F.; the several stages of temperature being developed throughout the bath without materially increasing the temperature of any portion of the bath beyond that of the remainder thereof.

8. The improvement in the art of recovering manganese steel, which consists in applying heat to the steel at an initial temperature below the oxidizing temperature of manganese, and at successively increasing stages of temperature until the entire mass is gradually brought to the melting point of manganese steel; additional manganese being supplied to the bath in the melting furnace.

9. The improvement in the art of recovering manganese steel, which consists in applying heat to the steel at an initial temperature below the oxidizing temperature of manganese, and at successively increasing stages of temperature until the entire mass is gradually brought to the melting point of manganese steel; the bath being maintained at about the melting temperature until the metal is needed, and the temperature being increased to the point of high fluidity of the metal immediately preceding the tapping of the furnace; additional manganese being supplied to the bath in the melting furnace.

Signed at Chicago Heights, Illinois, this 26th day of April, 1918.

WESLEY G. NICHOLS.